United States Patent
Jakimov et al.

(10) Patent No.: US 12,121,970 B2
(45) Date of Patent: Oct. 22, 2024

(54) LAYER BUILDING PROCESS AND LAYER BUILDING APPARATUS FOR THE ADDITIVE MANUFACTURE OF AT LEAST ONE WALL OF A COMPONENT, AS WELL AS COMPUTER PROGRAM PRODUCT AND STORAGE MEDIUM

(71) Applicant: MTU Aero Engines AG, Munich (DE)

(72) Inventors: Andreas Jakimov, Fahrenzhausen (DE); Steffen Schlothauer, Erdweg (DE); Katrin Friedberger, Odelzhausen (DE)

(73) Assignee: MTU Aero Engines AG, Munich (DE)

( * ) Notice: Subject to any disclaimer, the term of this patent is extended or adjusted under 35 U.S.C. 154(b) by 491 days.

(21) Appl. No.: 17/603,745

(22) PCT Filed: Mar. 19, 2020

(86) PCT No.: PCT/DE2020/000063
§ 371 (c)(1),
(2) Date: Oct. 14, 2021

(87) PCT Pub. No.: WO2020/211887
PCT Pub. Date: Oct. 22, 2020

(65) Prior Publication Data
US 2022/0241860 A1    Aug. 4, 2022

(30) Foreign Application Priority Data
Apr. 17, 2019 (DE) .................... 10 2019 205 587.7

(51) Int. Cl.
*B22F 10/28* (2021.01)
*B22F 5/00* (2006.01)
(Continued)

(52) U.S. Cl.
CPC .............. *B22F 12/30* (2021.01); *B22F 5/009* (2013.01); *B22F 10/28* (2021.01); *B22F 10/36* (2021.01);
(Continued)

(58) Field of Classification Search
CPC .......... B22F 10/28; B22F 10/36; B22F 10/38; B22F 12/10; B22F 12/30; B22F 12/41;
(Continued)

(56) References Cited

U.S. PATENT DOCUMENTS

2015/0064048 A1   3/2015   Bessac et al.
2015/0198052 A1   7/2015   Pavlov et al.
(Continued)

FOREIGN PATENT DOCUMENTS

CN   106891006 A      6/2017
CN   107159886 A  *   9/2017
(Continued)

OTHER PUBLICATIONS

Application of Laser Re-melting on Selective Laser Melting Parts Yasa E and Kruth J (Year: 2011).*
(Continued)

*Primary Examiner* — Jenny R Wu
(74) *Attorney, Agent, or Firm* — Hinckley, Allen & Snyder, LLP; David R. Josephs

(57) ABSTRACT

The invention relates to a layer building process for the additive manufacture of at least one wall region of a component including applying at least one powder layer of a material to at least one building-up and joining zone of at least one movable building platform, carrying out a first solidifying step, in which the material is irradiated selectively with at least one energy beam, wherein irradiation parameters of the at least one energy beam are set so a molten bath is produced and a defect-affected wall region of
(Continued)

Figure 1:
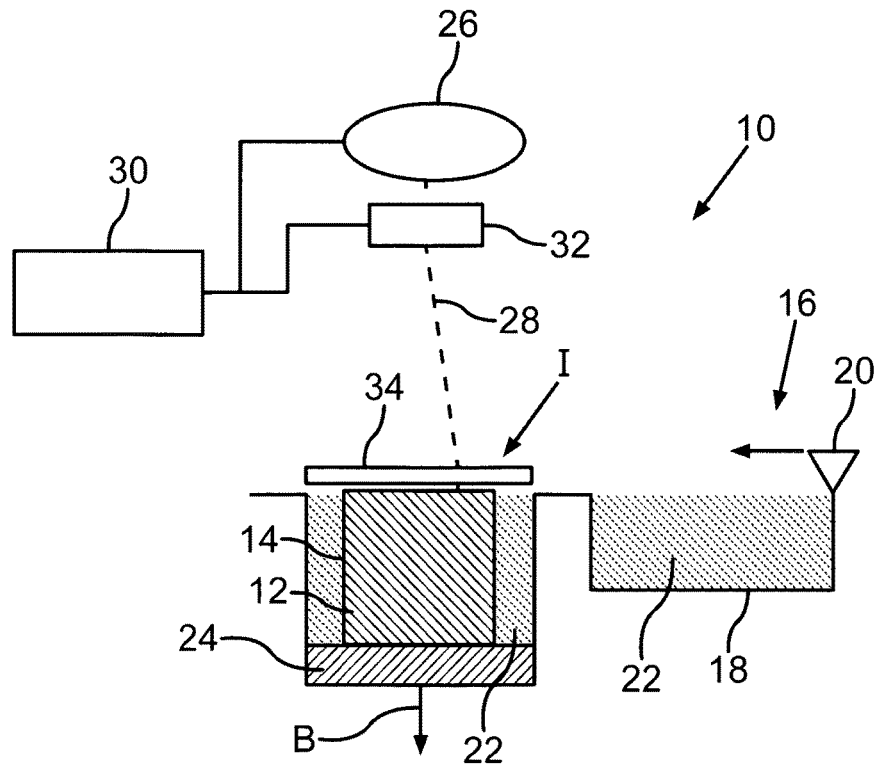

the wall is produced, without applying a further powder layer, carrying out a second solidifying step, in which the defect-affected wall region produced in the first solidifying step is irradiated selectively with the at least one energy beam, lowering the building platform layer by layer by a predefined layer thickness, and repeating the steps above one or more times.

11 Claims, 1 Drawing Sheet

(51) Int. Cl.
| | |
|---|---|
| *B22F 10/36* | (2021.01) |
| *B22F 10/38* | (2021.01) |
| *B22F 12/30* | (2021.01) |
| *B22F 12/41* | (2021.01) |
| *B33Y 10/00* | (2015.01) |
| *B33Y 30/00* | (2015.01) |
| *B33Y 80/00* | (2015.01) |
| *B22F 12/10* | (2021.01) |

(52) U.S. Cl.
CPC ............. *B22F 10/38* (2021.01); *B33Y 10/00* (2014.12); *B33Y 30/00* (2014.12); *B33Y 80/00* (2014.12); *B22F 12/10* (2021.01); *B22F 12/41* (2021.01)

(58) Field of Classification Search
CPC ............. B22F 2203/00; B22F 2999/00; B22F 3/1115; B22F 3/1118; B22F 5/009; B23K 26/342; B33Y 10/00; B33Y 30/00; B33Y 50/02; B33Y 80/00; B29C 64/153; B29C 64/393; C22C 1/0433; C22C 1/0458; F01D 11/12
See application file for complete search history.

(56) References Cited

U.S. PATENT DOCUMENTS

| | | |
|---|---|---|
| 2016/0236414 A1 | 8/2016 | Reese et al. |
| 2016/0237836 A1 | 8/2016 | Harris |
| 2017/0182562 A1* | 6/2017 | Das .......................... B23P 6/007 |
| 2019/0106993 A1 | 4/2019 | Burd |

FOREIGN PATENT DOCUMENTS

| | | |
|---|---|---|
| DE | 102010054113 A1 | 6/2012 |
| DE | 102016209618 A1 | 12/2017 |
| EP | 3321004 A1 | 5/2018 |
| EP | 3372395 A2 | 9/2018 |
| WO | 2015055361 A1 | 4/2015 |

OTHER PUBLICATIONS

Application of Laser Re-melting on Selective Laser melting Parts Yasa E and Kruth J Advances in Production Engineering and Management 6(2011)4 , 259-270 (Year: 2011).*

Aboulkhair, N. et al., "Reducing porosity in AlSi10Mg parts processed by selective laser melting", ScienceDirect-Additive Manufacturing 1-4 (2014) pp. 77-86, Elsevier B.V. 2014.

Ahuja, B. et al., "Developing LBM process parameters for Ti-6Al-4V thin wall structures and determining the corresponding mechanical characteristics", ScienceDirect—Physics Procedia 56 (2014) pp. 90-98, Elsevier B.V. 2014.

Weingarten, C. et al., "Formation and reduction of hydrogen porosity during selective laser melting of AlSi10Mg", Journal of Materials Processing Technology 221 (2015) pp. 112-120, Elsevier B.V. 2015.

Demir, A. G. et al., "Investigation of remelting and preheating in SLM of 18Ni300 maraging steel as corrective and preventive measures for porosity reduction", CrossMark, Int. Journal Advanced Manufacturing Technology (2017) 93:2697-2709.

Liu, B. et al., "Selective laser remelting of an additive layer manufacturing process on AlSi10Mg", ScienceDirect—Results in Physics, 12 (2019) pp. 982-988, Elsevier B.V. 2018.

* cited by examiner

LAYER BUILDING PROCESS AND LAYER BUILDING APPARATUS FOR THE ADDITIVE MANUFACTURE OF AT LEAST ONE WALL OF A COMPONENT, AS WELL AS COMPUTER PROGRAM PRODUCT AND STORAGE MEDIUM

BACKGROUND OF THE INVENTION

The invention relates to a layer building process and a layer building apparatus for the additive manufacture of at least one wall of a component. The invention further relates to a computer program product, a computer-readable storage medium, and a component with at least one additively manufactured wall.

Additive layer building processes refer to processes in which, on the basis of a virtual model of a component or component region that is to be manufactured, geometric data that are partitioned into layer data (so-called "slices") are determined. Depending on the geometry of the model, an exposure or irradiation strategy is determined, in accordance with which the selective solidification of a material is to occur. Besides the number and arrangement of irradiation vectors, such as, for example, line exposure, strip exposure, chess strategy, island strategy, etc., irradiation parameters, such as, for example, the power of the energy beam and the exposure speed of an energy beam that is to be used for the solidification are of importance. In the layer building process, the desired material is then deposited layer by layer and solidified selectively by means of the at least one energy beam in order to additively build up the desired component region. Additive or generative manufacturing methods accordingly differ from conventional material-removing or primary shaping methods of fabrication. Examples of additive manufacturing methods are generative laser sintering and laser melting methods, which, for example, can be used for the production of components for turbomachines such as aircraft engines. In selective laser melting, thin layers of the material or materials used are applied to a building platform and are melted and solidified locally in a building-up and joining zone with the use of one laser beam or a plurality of laser beams. Subsequently, the building platform is lowered and another powder layer is applied and again locally solidified. This cycle is repeated until the finished component or the finished component region is obtained. If need be, the component can subsequently be further processed or else can be used without further processing steps. In selective laser sintering, the component is produced in a similar way by laser-assisted sintering of powdered materials. The supply of energy n this case occurs, for example, by way of laser beams of a $CO_2$ laser, a Nd:YAG laser, a Yb fiber laser, a diode laser, or the like. Also known are electron beam methods, in which the material is solidified by way of one electron beam or a plurality of electron beams.

In the case of various components, it is important that walls or wall regions with wall thicknesses that are as small as possible can be produced. For example, abradable seals, such as, for instance, honeycomb seals for turbomachines, have to be as thin-walled as possible in order to afford the least possible resistance to a running-in sealing fin. In a layer building process of this kind, a single laser track or electron beam track corresponds in principle to the thinnest structure or wall thickness that can be produced. As a rule, owing to thermal conduction effects, the cure width (cure zone) even amounts to somewhat more than the focal diameter or the track width, so that, for thin structures, an energy input that is also as small as possible is required. The track width and the energy input into the material can be minimized by way of corresponding exposure parameters. However, a low energy input and/or a high exposure speed lead or leads to an increased number of defects (in particular fusion defects) in the manufactured structures, as a result of which, in the case of abradable seals, it is no longer possible to ensure an adequate sealing effect.

SUMMARY OF THE INVENTION

The object of the present invention is to improve a layer building process and a layer building apparatus of the kind mentioned in the introduction in such a way that a production of thin wall regions with improved mechanical properties is made possible. Further objects of the invention are composed of presenting a computer program product and a computer-readable storage medium that make possible a corresponding control of such a layer building apparatus. Finally, an object of the invention is to present a component with at least one additively manufactured wall region having improved mechanical properties.

The objects are achieved by a layer building process, by a layer building apparatus, by a computer program product, by a computer-readable storage medium, and by a component in accordance with the present invention. Advantageous embodiments with appropriate further developments of the invention are discussed in detail below, whereby advantageous embodiments of each aspect of the invention are to be regarded as advantageous embodiments of each of the other aspects of the invention.

A first aspect of the invention relates to a layer building process for the additive manufacture of at least one wall region of a component, in particular of an abradable seal of a turbomachine. The layer building process according to the invention comprises at least the steps a) applying at least one powder layer of a material to at least one building-up and joining zone of at least one movable building platform, b) carrying out a first solidifying step, in which the material is selectively irradiated with at least one energy beam, wherein irradiation parameters of the at least one energy beam are set in such a way that a molten bath with a molten bath diameter that is at least 25% of a wall thickness that is to be manufactured, is produced and a defect-affected wall region of the wall is produced, c) without applying a further powder layer, carrying out a second solidifying step, in which the defect-affected wall region produced in the first solidifying step is selectively irradiated with the at least one energy beam, wherein the irradiation parameters of the at least one energy beam are set in such a way that the defect-affected wall region is remelted to form a wall region with a lower density of defects, d) lowering the building platform layer by layer by a predefined layer thickness, and e) repeating the steps a) to d) one or more times. In other words, in accordance with the invention, it is provided that the wall region of the wall that is to be produced is produced by at least twice exposing or scanning the powdered material to or with the energy beam at a relatively low incoupling of energy and without renewed powder application between the two solidifying steps. This operation is then repeated for at least one further wall region or for all wall regions until the wall is finished. In this way, is possible to produce very thin walls with relatively high mechanical stability, because, owing to the second solidifying step, defects, such as, for example, fusion defects, that are known to have been formed in the first solidifying step can be healed completely or at least nearly completely, depending on the exposure parameters, without any ensuing significant increase in the wall thickness. In the first solidifying step, the exposure parameters that are set lead to such a small energy input that a defect-affected wall structure is formed, which, without the second solidifying step, could not be or could not acceptably be built up over a plurality of layers. In this way, it is possible to realize an especially small molten bath diameter. A molten bath diameter that amounts to at least 25% of the wall thickness to be produced is understood to mean, in particular, a molten bath diameter of 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% of the wall thickness to be produced. In other words, the molten bath diameter corresponds at most to the wall thickness to be produced, but at least one-fourth of the wall thickness to be produced, so that, at most, two, three, or four adjacently lying, non-overlapping exposure vectors or scans form the layer region in question of the wall to be produced. It is to be emphasized here that, in basic principle, it is also possible to provide region-by-region or fully overlapping exposure vectors (hatches) or scans. In the first solidifying step, the irradiation parameters are to be set in such a way that, preferably in the directly adjoining vicinity of the molten bath, the material powder is drawn into the forming melt in order to form the defect-affected wall region. After this operation, no or only very little unsolidified material powder remains left over on the defect-affected wall region as well as in the adjoining surroundings. In the second solidifying step, the relatively weak energy of the energy beam is preferably used only to remelt the already solidified material in the wall region so as, in this way, to heal the existing defects in part or in full and to ensure the requisite mechanical stability. In this solidifying step, the input energy should preferably be set to be as small as possible. In summary, the energy inputs of the two solidifying steps are adjusted with respect to each other in such a way that the molten bath diameter that is formed in the first solidifying step does not exceed the desired wall thickness and that, in the second solidifying step, as little as possible and preferably no further material powder is drawn in, but rather only the already produced defect-affected wall region is remelted in order to heal the defects of the first solidifying step in part or in full. If need be, step c)—in each instance, without additional powder application—can be repeated one or more times in order to ensure an especially small density of defects and a correspondingly high mechanical stability of the manufactured wall region. In general, it is possible by use of the method to produce not only wall regions or individual walls, but also complete components. In the scope of this disclosure, the expressions "a/an" are to be read as indefinite articles, that is, in the absence of any statement to the contrary, can always also be read as "at least one." Conversely, "a/an" can also be understood to mean "only one."

In an advantageous embodiment of the invention, it is provided that a wall with a wall thickness of between 100 µm and 4000 µm, that is, for example, with a wall thickness of 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 510 µm, 520 µm, 530 µm, 540 µm, 550 µm, 560 µm, 570 µm, 580 µm, 590 µm, 600 µm, 610 µm, 620 µm, 630 µm, 640 µm, 650 µm, 660 µm, 670 µm, 680 µm, 690 µm, 700 µm, 710 µm, 720 µm, 730 µm, 740 µm, 750 µm, 760 µm, 770 µm, 780 µm, 790 µm, 800 µm, 810 µm, 820 µm, 830 µm, 840 µm, 850 µm, 860 µm, 870 µm, 880 µm, 890 µm, 900 µm, 910 µm, 920 µm, 930 µm, 940 µm, 950 µm, 960 µm, 970 µm, 980 µm, 990 µm, 1000 µm, 1010 µm, 1020 µm, 1030 µm, 1040 µm, 1050 µm, 1060 µm, 1070 µm, 1080 µm, 1090 µm, 1100 µm, 1110 µm, 1120 µm, 1130 µm, 1140 µm, 1150 µm, 1160 µm, 1170 µm, 1180 µm, 1190 µm, 1200 µm, 1210 µm, 1220 µm, 1230 µm, 1240 µm, 1250 µm, 1260 µm, 1270 µm, 1280 µm, 1290 µm, 1300 µm, 1310 µm, 1320 µm, 1330 µm, 1340 µm, 1350 µm, 1360 µm, 1370 µm, 1380 µm, 1390 µm, 1400 µm, 1410 µm, 1420 µm, 1430 µm, 1440 µm, 1450 µm, 1460 µm, 1470 µm, 1480 µm, 1490 µm, 1500 µm, 1510 µm, 1520 µm, 1530 µm, 1540 µm, 1550 µm, 1560 µm, 1570 µm, 1580 µm, 1590 µm, 1600 µm, 1610 µm, 1620 µm, 1630 µm, 1640 µm, 1650 µm, 1660 µm, 1670 µm, 1680 µm, 1690 µm, 1700 µm, 1710 µm, 1720 µm, 1730 µm, 1740 µm, 1750 µm, 1760 µm, 1770 µm, 1780 µm, 1790 µm, 1800 µm, 1810 µm, 1820 µm, 1830 µm, 1840 µm, 1850 µm, 1860 µm, 1870 µm, 1880 µm, 1890 µm, 1900 µm, 1910 µm, 1920 µm, 1930 µm, 1940 µm, 1950 µm, 1960 µm, 1970 µm, 1980 µm, 1990 µm, 2000 µm, 2010 µm, 2020 µm, 2030 µm, 2040 µm, 2050 µm, 2060 µm, 2070 µm, 2080 µm, 2090 µm, 2100 µm, 2110 µm, 2120 µm, 2130 µm, 2140 µm, 2150 µm, 2160 µm, 2170 µm, 2180 µm, 2190 µm, 2200 µm, 2210 µm, 2220 µm, 2230 µm, 2240 µm, 2250 µm, 2260 µm, 2270 µm, 2280 µm, 2290 µm, 2300 µm, 2310 µm, 2320 µm, 2330 µm, 2340 µm, 2350 µm, 2360 µm, 2370 µm, 2380 µm, 2390 µm, 2400 µm, 2410 µm, 2420 µm, 2430 µm, 2440 µm, 2450 µm, 2460 µm, 2470 µm, 2480 µm, 2490 µm, 2500 µm, 2510 µm, 2520 µm, 2530 µm, 2540 µm, 2550 µm, 2560 µm, 2570 µm, 2580 µm, 2590 µm, 2600 µm, 2610 µm, 2620 µm, 2630 µm, 2640 µm, 2650 µm, 2660 µm, 2670 µm, 2680 µm, 2690 µm, 2700 µm, 2710 µm, 2720 µm, 2730 µm, 2740 µm, 2750 µm, 2760 µm, 2770 µm, 2780 µm, 2790 µm, 2800 µm, 2810 µm, 2820 µm, 2830 µm, 2840 µm, 2850 µm, 2860 µm, 2870 µm, 2880 µm, 2890 µm, 2900 µm, 2910 µm, 2920 µm, 2930 µm, 2940 µm, 2950 µm, 2960 µm, 2970 µm, 2980 µm, 2990 µm, 3000 µm, 3010 µm, 3020 µm, 3030 µm, 3040 µm, 3050 µm, 3060 µm, 3070 µm, 3080 µm, 3090 µm, 3100 µm, 3110 µm, 3120 µm, 3130 µm, 3140 µm, 3150 µm, 3160 µm, 3170 µm, 3180 µm, 3190 µm, 3200 µm, 3210 µm, 3220 µm, 3230 µm, 3240 µm, 3250 µm, 3260 µm, 3270 µm, 3280 µm, 3290 µm, 3300 µm, 3310 µm, 3320 µm, 3330 µm, 3340 µm, 3350 µm, 3360 µm, 3370 µm, 3380 µm, 3390 µm, 3400 µm, 3410 µm, 3420 µm, 3430 µm, 3440 µm, 3450 µm, 3460 µm, 3470 µm, 3480 µm, 3490 µm, 3500 µm, 3510 µm, 3520 µm, 3530 µm, 3540 µm, 3550 µm, 3560 µm, 3570 µm, 3580 µm, 3590 µm, 3600 µm, 3610 µm, 3620 µm, 3630 µm, 3640 µm, 3650 µm, 3660 µm, 3670 µm, 3680 µm, 3690 µm, 3700 µm, 3710 µm, 3720 µm, 3730 µm, 3740 µm, 3750 µm, 3760 µm, 3770 µm, 3780 µm, 3790 µm, 3800 µm, 3810 µm, 3820 µm, 3830 µm, 3840 µm, 3850 µm, 3860 µm, 3870 µm, 3880 µm, 3890 µm, 3900 µm, 3910 µm, 3920 µm, 3930 µm, 3940 µm, 3950 µm, 3960 µm, 3970 µm, 3980 µm, 3990 µm, or 4000 µm is produced, wherein respective intermediate values are to be regarded as disclosed as well. Alternatively or additionally, it is provided that a wall with a wall height of at least 1 mm, that is, for example, of 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, 40 mm, 41 mm, 42 mm, 43 mm, 44 mm, 45 mm, 46 mm, 47 mm, 48 mm, 49 mm, 50 mm, or more is produced. In this way, it is possible in an optimal manner to adjust the dimensions of the wall to be produced to different cases of application. In general, the wall thickness and/or the wall height can be chosen to be constant or else to vary locally.

Further advantages ensue in that, in step b), the irradiation parameters of the at least one energy beam are set in such a way that the molten bath has a molten bath diameter of between 50 μm and 1000 μm, that is, for example, of 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 510 μm, 520 μm, 530 μm, 540 μm, 550 μm, 560 μm, 570 μm, 580 μm, 590 μm, 600 μm, 610 μm, 620 μm, 630 μm, 640 μm, 650 μm, 660 μm, 670 μm, 680 μm, 690 μm, 700 μm, 710 μm, 720 μm, 730 μm, 740 μm, 750 μm, 760 μm, 770 μm, 780 μm, 790 μm, 800 μm, 810 μm, 820 μm, 830 μm, 840 μm, 850 μm, 860 μm, 870 μm, 880 μm, 890 μm, 900 μm, 910 μm, 920 μm, 930 μm, 940 μm, 950 μm, 960 μm, 970 μm, 980 μm, 990 μm, or 1000 μm, wherein respective intermediate values are to be regarded as being disclosed as well. In this way, it is possible in an optimal manner to adjust the wall thickness of the wall to be produced to different cases of application.

Further advantages ensue in that, in the first solidifying step and in the second solidifying step, identical or different irradiation parameters are set, and/or in that at least one irradiation parameter chosen from the group composed of energy beam power and exposure speed is varied one or more times during the first solidifying step and/or second solidifying step. In this way, it is possible to adjust the mechanical properties of the resulting wall depending on the location. In the first solidifying step, it can be provided that the spatial defect density is adjusted through variation or adjustment of the irradiation parameters. Alternatively or additionally, in the second solidifying step, the extent of the healing of the defects that are present can be adjusted through variation or adjustment of the irradiation parameters.

In a further advantageous embodiment of the invention, it is provided that, in the second solidifying step, the irradiation parameters are set in such a way that, essentially at least, no adjoining powdered material is drawn into the remelted wall region. In other words, the irradiation parameters are set in such a way that the input energy is so low that unsolidified material powder is drawn from the adjoining vicinity of the remelting wall region into the second melt not at all or only to a very small extent, because this would lead to an increase in the wall thickness. In the second solidifying step, the wall thickness is intended to change in magnitude by at most 10%, that is, for example, by 0%, 1%, 2%, 3%, 4%, 5%, 6%, 7%, 8%, 9%, or 10%.

In a further advantageous embodiment of the invention, it is provided that, in the first solidifying step and/or second solidifying step, the irradiation parameters are set in such a way that, in the wall region that is produced, a prespecified spatial defect density is produced. In other words, in the second solidifying step, the defect-affected wall region is not yet fully healed and, instead, the defect density is only diminished, so that the resulting wall region and thus the finished wall has a prespecified spatial defect density. A wall that has been weakened by deliberate defects can influence in a positive manner the running-in behavior of an abradable seal, for example, because the risk of damage to the running-in counterpart (for example, a sealing fin, a blade tip, or the like) can be markedly diminished.

In a further advantageous embodiment of the invention, it is provided that, in the first solidifying step and/or the second solidifying step, the energy beam power, as an exposure parameter of the energy beam, is set to a value of at most 80% of a maximal energy beam power of the energy beam, that is, for example, to 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, or less of the maximal energy beam power of the energy beam and/or the exposure speed of the energy beam is set to at least 50% of a maximal exposure speed, that is, for example, to 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% of the maximal exposure speed of the energy beam. In this way, it is possible to adjust the energy input in the first solidifying step and/or second solidifying step in an optimal manner and to minimize it. Alternatively or additionally, it is provided that, in the first solidifying step and/or second solidifying step, a cross-sectional area of the energy beam is set in the building-up and joining zone. This can be done, for example, by use of a corresponding optical device. In this way, it is possible to adjust the track width and the energy input of the energy beam and to minimize them in order to be able to produce especially thin wall regions.

Further advantages ensue in that a plurality of walls are produced in the form of a honeycomb structure. In this way, it is possible to produce a component with an especially high sealing effect and a good abrading behavior.

In a further advantageous embodiment of the invention, it is provided that, as material, a refractory alloy, in particular a nickel-based alloy and/or a cobalt-based alloy, and/or an intermetallic material, in particular a titanium aluminide, is used. Although the material, in basic principle, can also be a plastic, such as, for example, ABS, PLA, PETG, nylon, PET, PTFE, or the like, it is possible through the use of metallic or intermetallic materials, in general, to produce wall regions with higher mechanical, thermal, and chemical resistance. For example, the material can contain elements taken from the group composed of iron, titanium, nickel, chromium, cobalt, copper, aluminum, and titanium. The material can be an alloy taken from the group composed of steel, aluminum alloy, titanium alloy, cobalt alloy, chromium alloy, nickel-based alloy, and copper alloys. It is equally possible to provide intermetallic alloys, such as $Mg_2Si$ and titanium aluminides. For example, the material can be a nickel-based alloy with resistance to high temperatures, such as, for instance, Mar M-247, Inconel 718 (IN718), Inconel 738 (IN738), or Waspaloy or C263. Conversely, it can be provided that the material is not an aluminum alloy, in particular not an AlSiMg alloy.

A second aspect of the invention relates to a layer building apparatus for the additive manufacture of a least one wall region of a component by way of an additive layer building process. The apparatus comprises at least one powder feed for the application of at least one powder layer of a material to a building-up and joining zone of a movable building platform, at least one radiation source for producing at least one energy beam for the layer-by-layer and local solidification of the material for the formation of the wall region by selective irradiation of the material in accordance with a predetermined exposure strategy, and a control device. The control device is designed so as to control the powder feed in such a way that it applies at least one powder layer of the material to the building-up and joining zone of the building platform, and so that the building platform can be lowered layer by layer by a predefined layer thickness. In accordance with the invention, the control device is additionally configured or designed to carry out a first solidifying step, in which the material is irradiated selectively with the at least one energy beam, wherein irradiation parameters of the at least one energy beam are set in such a way that a molten bath with a molten bath diameter that is at least 25% of a wall thickness that is to be manufactured is produced and that a defect-affected wall region of the wall is produced, and, without applying a further powder layer, to carry out a second solidifying step, in which the wall region that is produced in the first solidifying step is selectively irradiated with the at least one energy beam, wherein the irradiation parameters of the at least one energy beam are set in such a way that the defect-affected wall region is remelted to form a wall region with a lower density of defects. In this way, it is possible to manufacture especially thin-walled structures with improved mechanical properties. Further features and the advantages thereof may be taken from the descriptions of the first aspect of the invention, wherein advantageous embodiments of the first aspect of the invention are to be regarded as advantageous embodiments of the second aspect of the invention. Conversely, advantageous embodiments of the second aspect of the invention are to be regarded as advantageous embodiments of the first aspect of the invention.

In an advantageous embodiment of the invention, it is provided that the apparatus is designed as a selective laser sintering and/or laser melting device. In this way, it is possible to produce wall regions, walls, and complete components, the mechanical properties of which correspond, essentially at least, to those of the component material. For the production of a laser beam, it is possible to provide, for example, a $CO_2$ laser, a Nd:YAG laser, a Yb fiber laser, a diode laser, or the like. Equally, it can be provided that two or more electron beams and/or laser beams are used, the exposure and solidification parameters of which are adjusted or set in the way previously described.

A further aspect of the invention relates to a computer program product, comprising commands, which, when the computer program product is executed by a control device of a layer building apparatus in accordance with the second aspect of the invention, causes the layer building apparatus to carry out the layer building process in accordance with the first aspect of the invention. A further aspect of the invention relates to a computer-readable storage medium, comprising commands, which, when the computer program product is executed by a control device of a layer building apparatus in accordance with the second aspect of the invention, causes the layer building apparatus to carry out the layer building process in accordance with the first aspect of the invention.

The present invention can be implemented by use of a computer program product, which comprises program modules that are accessible from a computer-usable or computer-readable medium and which store program code that is used by or in association with one or a plurality of computers, processors, or command execution systems of a layer building apparatus. For the purposes of this description, a computer-usable or computer-readable medium can be any apparatus that is able to store, communicate, disseminate, or transport the computer program product for use by or in association with the command execution system, the apparatus, or can contain the apparatus. The medium can be an electronic, magnetic, optical, electromagnetic, infrared, or semiconductor system or a dissemination medium as such, because signal carriers are not included in the definition of the physical, computer-readable medium. Included are a semiconductor or solid-state memory, magnetic tape, an exchangeable computer diskette, a direct access memory (RAM), a read-only memory (ROM), a rigid magnetic plate, and an optical plate, such as a read-only plate (CD-ROM, DVD, Blue-Ray, etc.) or a writable optical plate (CD-R, DVD-R). Both the processors and the program code for implementing the individual aspects of the invention can be centralized or distributed (or a combination thereof).

A further aspect of the invention relates to a component, in particular an abradable seal of a turbomachine, comprising at least one wall that is produced by means of a layer building apparatus in accordance with the second aspect of the invention and/or by means of a layer building process in accordance with the first aspect of the invention. The ensuing features and the advantages thereof may be taken from the descriptions of the first and second aspects of the invention, wherein advantageous embodiments or each aspect of the invention are to be regarded as advantageous embodiments of the other respective aspect of the invention. The component can be designed as a honeycomb seal for a gas turbine, in particular for an aircraft engine.

BRIEF DESCRIPTION OF THE DRAWING FIGURES

Figure 2:
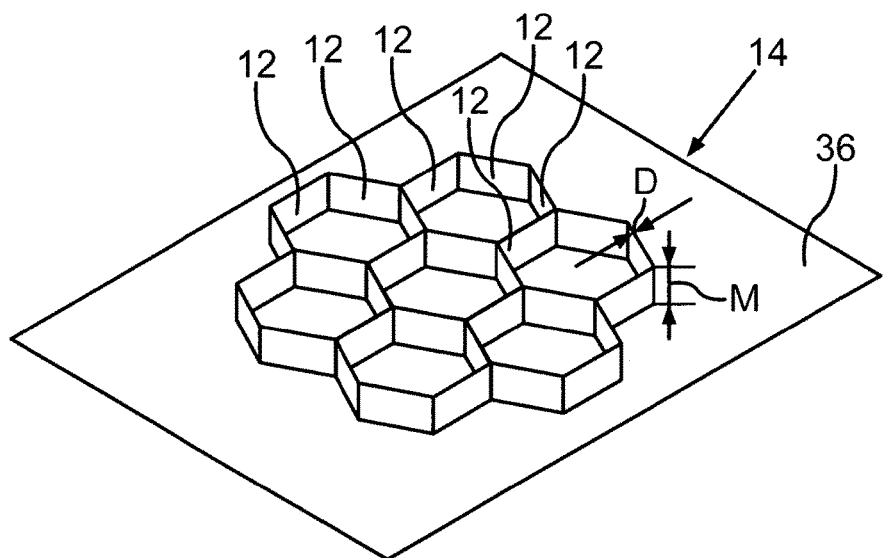

Further features of the invention ensue from the dependent claims, the figures, and the descriptions of the figures. The features and combinations of features mentioned above in the description as well as the features and combinations of features shown below in the descriptions of the figures and/or solely in the figures are not only usable in the respectively presented combination, but also in other combinations, without departing from the scope of the invention. Accordingly, embodiments of the invention that are not explicitly shown and explained in the figures, but which are inferred and can be produced from the explained embodiments by separate combinations of features are also to be comprised in and regarded as embodiments of the invention. Hence, embodiments and combinations of features that do not have all features of an originally formulated independent claim are also to be regarded as being disclosed. Beyond this, embodiments and combinations of features, in particular those that ensue through the embodiments presented above and go beyond or deviate from the combinations of features presented in references to the claims, are also to be regarded as being disclosed. Shown are:

FIG. 1 a schematic sectional view of a layer building apparatus according to the invention; and FIG. 2 a schematic perspective view of a component according to the invention.

DESCRIPTION OF THE INVENTION

FIG. 1 shows a schematic sectional view of a layer building apparatus 10 according to the invention. The layer building apparatus 10 serves for the additive manufacture of at least one wall 12 of a component 14 (see FIG. 2) by way of an additive layer building process. The layer building apparatus 10 comprises at least one powder feed 16 with a powder tank 18 and a layer applicator 20. The one powder feed 16 serves for the application of at least one powder layer of a material 22 to a building-up and joining zone I of a building platform 24 that can be moved in accordance with arrow B. The layer building apparatus 10 further comprises at least one radiation source 26 for producing at least one energy beam 28, whereby it is possible to irradiate the material 22 layer by layer and locally in accordance with a prespecified exposure strategy in order to build up the wall 12 layer by layer from corresponding wall regions. The term "wall region" therefore refers to the part of the finished wall 12 that lies in a specific physical individual layer, the wall being built up in a layer-by-layer manner from a corresponding number of individual layers. Additionally provided is a control device 30, which is designed to control the powder feed 16 in such a way that it applies at least one powder layer of the material 22 to the building-up and joining zone I of the building platform 24. Furthermore, the control device 30 is designed to generate control signals that bring about a lowering of the building platform 24 by a predefined layer thickness in accordance with arrow B. In addition, the control device 30 is configured to carry out a first solidifying step, in which the material 22 for the formation of a wall region of the wall 12 is irradiated selectively with the at least one energy beam 28, wherein irradiation parameters of the at least one energy beam 28 are set in such a way that a molten bath with a molten bath diameter that is at least 25% of a wall thickness that is to be produced is produced. After the molten bath has cooled, the material 22 then solidifies to form a defect-affected wall region of the wall 12. Furthermore, the control device 30 is configured, without application of a further powder layer, to carry out a second solidifying step, in which the defect-affected wall region produced in the first solidifying step of the wall 12 is irradiated selectively with the at least one energy beam 28, wherein the irradiation parameters of the at least one energy beam 28 are set in such a way that solely the defect-affected wall region is remelted to form an intact or at least essentially intact wall region of the wall 12. Preferably, the irradiation parameters are hereby set in such a way that no unsolidified powder is drawn into the second melt, because this would lead to a widening of the wall region and thus of the finished wall 12.

Furthermore, the layer building apparatus 10 comprises an optical device 32, by means of which the energy beam 28 can be moved over the building-up and joining zone I. The radiation source 26 and the device 32 are coupled to the control device 30 for the exchange of data. Furthermore, the layer building apparatus 10 comprises a heating device 34, which, in basic principle, is optional and by means of which the powder bed can be controlled to a desired base temperature. The heating device 34 can comprise, for example, one induction coil or a plurality of induction coils. Alternatively or additionally, it is also possible to provide other heating elements, such as, for example, IR radiators or the like.

FIG. 2 shows a schematic perspective view of the component 14, which was produced by use of the layer building apparatus 10. In the present case, by way of example, the component 14 is made of Inconel 718 (IN718) and has an unusually high thermal resistance of up 700° C. as well as a high resistance towards oxidation and corrosion. Added to this is an excellent strength with high extensional properties, tensile strength properties, and creep rupture properties. Additively manufactured IN718 retains its strength over a broad temperature range and is therefore an attractive option for extreme temperature conditions, such as those prevailing, for example, in turbines of aircraft engines. However, the material can also be used at very low temperatures, such as, for example, in cryogenic environments.

It can be seen that the component 14 is designed as a honeycomb seal and has thin walls 12 arranged in a honeycomb manner, which are built up layer by layer on a flat base body 36 that serves as a seal carrier. In terms of their wall thickness D, the walls 12 correspond to the molten bath diameter produced by the energy beam 28, for instance, and have a respective wall height H of several millimeters. The base body 36 can likewise be produced additively or in another way. As already mentioned, the walls 12 are produced by twofold melting with a low incoupling of energy in order to minimize the diameter of the molten bath and thus the thickness D of the respectively produced wall region from which the walls 12 are built up layer by layer. To this end, in the first solidifying step, the exposure parameters used lead to such a weak energy input that it would not be possible or at least not acceptably be possible by means of a single exposure to build up the walls over a height of several millimeters. In the first solidifying step, the powdered material 22 is drawn into the melt in the vicinity of the molten bath produced by the energy beam 28 and a first, relatively strongly defect-affected wall region of the wall 12 forms. After this operation, no or only very little unsolidified powder remains left over on the defect-affected wall region as well as in its nearer vicinity. In the second solidifying step, likewise with an energy input that is as small as possible, solely the produced, defect-affected wall region is again remelted so as, in this way, to eliminate the existing defects either in full or else to adjust a desired density of defects. The energy input should hereby, if possible, not be so high that unsolidified powder is drawn from the further surroundings into the second melt, because this would lead to an increase in the wall thickness D. The energy inputs of the two solidifying steps are thus adjusted to each other such that, if possible, the initially produced wall thicknesses D do not exceed or exceed as little as possible the molten bath diameter and such that, during the second irradiation, if possible, no further powder is drawn in, but rather only the already produced wall region of the wall 12 in question is remelted.

For the application as an abradable honeycomb structure, the component 14 can be furnished or produced with deliberate quantities of defects. A wall 12 that is weakened by defects can influence the running-in behavior in a positive manner, because the risk of damage to the running-in counterpart (for example, a fin or a blade tip) can be markedly reduced.

The parameter values presented in the documents for definition of the process and measurement conditions for the characterization of specific properties of the subject of the invention are also to be regarded in the scope of deviations—for example, due to measurement errors, system errors, DIN tolerances, and the like—as being included in the scope of the invention.

What is claimed is:

1. A layer building process for the additive manufacture of at least one wall of an abradable seal of a turbomachine, comprising at least the following steps:

forming an abradable seal, having a plurality of upstanding walls in the form of a honeycomb structure, of a turbomachine using the following layer building process steps:
a) applying at least one powder layer of a material to at least one building-up and joining zone of at least one movable building platform;

b) carrying out a first solidifying step, in which the material is irradiated selectively with at least one energy beam, wherein irradiation parameters of the at least one energy beam are set so that a molten bath with a molten bath diameter that is at least 25% of a wall thickness that is to be manufactured is produced, and a defect-affected wall region of the wall is produced;

c) without applying a further powder layer, carrying out a second solidifying step, in which the defect-affected wall region produced in the first solidifying step is irradiated selectively with the at least one energy beam, wherein the irradiation parameters of the at least one energy beam are set in such a way that the defect-affected wall region is remelted to form a wall region of the wall with a smaller density of defects;

d) lowering the building platform layer by layer by a predefined layer thickness;

e) repeating the steps a) to d) one or more times; wherein the upstanding walls provide run-in sealing for a running-in counterpart turbomachine component in communication therewith.

2. The layer building process according to claim 1, wherein a wall with a wall thickness of between 100 μm and 4000 μm is produced and/or in that a wall with a wall height of at least 1 mm is produced.

3. The layer building process according to claim 1, wherein, in step b), the irradiation parameters of the at least one energy beam are set so that the molten bath has a molten bath diameter of between 50 μm and 1000 μm.

4. The layer building process according to claim 1, wherein, in the first solidifying step and in the second solidifying step, identical or different irradiation parameters are set and/or in that at least one irradiation parameter from the group composed of energy beam power and exposure speed is varied one or more times during the first solidifying step and/or second solidifying step.

5. The layer building process according to claim 1, wherein, in the second solidifying step, the irradiation parameters are set so that, at least substantially, no adjoining powdered material is drawn into the defect-affected wall region.

6. The layer building process according to claim 1, wherein, in the first solidifying step and/or second solidifying step, the irradiation parameters are set so that the wall has a prespecified spatial defect density.

7. The layer building process according to claim 1, wherein, in the first solidifying step and/or second solidifying step, the energy beam power, as exposure parameter of the energy beam, is set to a value of at most 80% of a maximal energy beam power and/or the exposure speed of the energy beam is set to at least 50% of a maximal exposure speed, and/or in that, in the first solidifying step and/or second solidifying step, a cross-sectional area of the energy beam is set in the building-up and joining zone.

8. The layer building process according to claim 1, wherein, as material, a nickel-based alloy and/or a cobalt-based alloy, and/or a titanium aluminide, is used.

9. The layer building process according to claim 1, further comprising:
a computer program product, comprising commands, which, during the execution of the computer program product by a control device of a layer building apparatus causes the layer building apparatus to execute a layer building process.

10. The layer building process according to claim 9, wherein a computer-readable storage medium, comprising commands, which, during the execution by a control device of a layer building apparatus causes the layer building apparatus to execute the layer building process.

11. The layer building process of claim 1, further comprising the steps of:
providing a base body seal carrier;
forming the plurality of walls in the form of a honeycomb structure on the base body seal carrier.

* * * * *